United States Patent [19]
Bar et al.

[11] Patent Number: 5,676,175
[45] Date of Patent: Oct. 14, 1997

[54] PLASTIC LINER

[75] Inventors: Yosef Bar, Jordan Valley; Gideon Pinto, Carmiel, both of Israel

[73] Assignee: Golan Plastic Products, Shaar Hogalan, Israel

[21] Appl. No.: 494,540

[22] Filed: Jun. 26, 1995

[51] Int. Cl.[6] ............................................. B29C 63/34
[52] U.S. Cl. .................... 138/97; 138/98; 264/516; 264/36; 264/269
[58] Field of Search ................. 264/36, 516, 269; 156/287, 294; 138/97, 98, 129, 130, 154, 155

[56] References Cited

U.S. PATENT DOCUMENTS 4,064,211 12/1977 Wood .
4,985,196 1/1991 LeDoux et al. .
5,091,137 2/1992 LeDoux .

FOREIGN PATENT DOCUMENTS

65886 12/1982 European Pat. Off. .
1394807 3/1965 France .
WO90/12241 10/1990 WIPO .

*Primary Examiner*—Mathieu D. Vargot
*Attorney, Agent, or Firm*—Sol Sheinbein

[57] ABSTRACT

A plastic liner having a second, deformed shape, and having a memory of a first, undeformed memory shape, the deformation in the deformed shape comprising one or more deformations, at least one of which is a twist deformation consisting of alternate left-right twists along the liner.

6 Claims, 6 Drawing Sheets

PLASTIC LINER

FIELD OF THE INVENTION

The invention generally relates to plastic pipes and more specifically relates to such pipes useful as liners, i.e. for lining of existing fluid ducts. The liners of the invention are of a kind which while having a certain shape, retain a "memory" of another shape which they can assume spontaneously under appropriate conditions. The present invention also relates to methods of lining of ducts and making use of such liners.

GLOSSARY

The following are meanings of some of the terms to be used herein:

Liner—a plastic pipe, either of the non-cross-linked (thermoplastic) or of the cross-linked (thermoset) kind, both of which may be crystalline, semi-crystalline or amorphous plastic materials, used for lining of ducts. It should be understood that this term also relates to any combination of the above materials in the form of blends, multi-layer structures, fiber-reinforced pipes and the like.

Memory—a property of the liner whereby, although having one shape in which it can be inserted into a duct to be lined, it has a molecular configuration so that at the activation temperature (see below) it spontaneously attempts to assume another, "memorized" shape.

Memory shape—the shape "memorized" by the liner which is the initial shape assumed by the pipe during its manufacturing process.

Deformed shape—the shape of the liner which allows its introduction into the duct to be lined. The deformed shape is a result of a deformation (see below) introduced into the liner after it has first assumed its original, memory shape.

Deformation—a process involving the introduction of internal stresses within the plastic material which can be released at a certain temperature ("activation temperature") whereby the plastic material attempts to assume its original, memory shape. Some deformations may involve a geometrical change and will thus be externally visible; other deformations, such as the twist deformation (see below) in accordance with the invention, may not give rise to any externally visible geometrical changes. The term "deformation" will, depending on the context, also be used to denote the change induced in the pipe in the deformation process.

Shape deformation—a geometrical deformation in which the cross-section of the liner is altered from an original cross-sectional shape, usually circular, (which is the memory shape), to another cross-sectional shape such as "U"-shape, "H"-shape, "X"-shape, petal shape and the like.

Size reduction deformation—a deformation in which the liner essentially retains the same original cross-sectional shape, but with reduced dimensions. For example, where the liner has an original circular cross-section, a size reduction deformation involves reducing the overall external diameter of the liner.

Twist deformation—a deformation involving the introduction of twists to the liner. A twist deformation in accordance with the invention involves alternate left-right twists along the liner.

Activation temperature—a temperature in which internal stresses introduced during the deformation process into the plastic material can be released at a practical rate (e.g. up to few hours). It should be noted that the use of the term "activation temperature" does not mean to denote that it is a single well defined temperature; in fact transition between a deformed or a non deformed shape occurs over a range of temperatures and its rate is dependent upon the actual temperature as well as the material properties. The term "activation temperature" should be understood as referring to such range.

BACKGROUND OF THE INVENTION AND PRIOR ART

After extended periods of use, fluid ducting systems may become leaky and need to be renovated. A method which gains popularity for such renovation, particularly of large ducts, such as sewage ducts, is the lining of the existing pipes by a liner made of a plastic material. One available method involves the use of an a priori soft liner which is impregnated with a synthetic resin so that it becomes soft; the soft liner is pressed against the walls of the duct typically by applying a fluid pressure, and then the resin is allowed to cure. This process gives rise to a rigid liner attached to the wall of the duct. Such a technique is disclosed, for example, in U.S. Pat. No. 4,064,211.

Another type of liners are pipes which are rigid at ambient temperature. Such pipes are typically made of polyethylene (typically high density polyethylene) or PVC. In order to facilitate insertion of the liners into the ducts to be lined, they have a deformed shape resulting from a shape deformation or a size deformation. After insertion of the liner into the duct to be lined, a hot fluid, such as super heated or saturated steam, is inserted into the liner and following an increase in temperature above the activation temperature, it switches to its memory shape and optionally, following additional deformation by the use of pressurized fluids, it expands to fit internal contours of the duct.

Various types of liners and methods for their use are known. French Patent 2,503,622 discloses a liner made of cross-linked polyethylene or another thermoset plastic material having an outer diameter of at least the inner diameter of the pipe to be lined. The liner is deformed at a temperature above the crystalline melting temperature so as to reduce its overall cross-sectional diameter and subsequently cooled to retain its deformed shape. Following its insertion into the duct, the liner is being reheated to at least its activation temperature consequently attempting to assume its original, memory shape.

U.S. Pat. No. 4,985,196 discloses a method whereby the liner is inserted and then pressurized in two stages while heated, to allow it to return to its original memory shape with minimal stresses. Similarly, U.S. Pat. No. 5,091,137 discloses a reforming process by which a non-cylindrical liner is positioned within the duct, is first heated to a first temperature and thereafter the temperature is increased to a temperature above the activation temperature to reactivate the memory of the cylindrical shape, and by further increasing the pressure, the liner is firmly attached to the walls of the duct.

One problem associated with a cross-sectional deformation resides in that the liner does not have the same bending characteristics in all directions. For example, when the liner is deformed into a "U"-shape, bending in a plane parallel to the arms of the "U" is much more difficult than bending in a plane normal thereto. Consequently, feeding the liner into a duct can be difficult whenever the conduit to be lined is not completely straight and the leading end of the liner has to follow a tortuous path. A solution to this problem has been proposed in WO 90/12241, which discloses the use of a thermoplastic liner which is twisted so that the foldable plane follows a helical path. The unfolding of the liner is done by supplying enough heat to soften the thermoplastic material to allow its expansion to a desired shape.

It is an object of the present invention to provide a liner which overcomes some of the problems associated with prior art liners as described above.

It is furthermore an object of the present invention to provide a method for lining of ducts making use of such a liner.

GENERAL DESCRIPTION OF THE INVENTION

The present invention provides a plastic liner having a second, deformed shape, and having a memory of a first, undeformed memory shape, the deformation in the deformed shape comprising one or more deformations, at least one of which is a twist deformation consisting of alternate left-right twists along the liner.

Typically, the deformations in the liner of the invention will include at least one other type of deformation which can be a shape deformation, a size reduction deformation, or a combination of two types of deformations of which one is a shape deformation and the other a size reduction deformation.

Liners used in accordance with the invention may be made from a wide range of plastic materials including both materials with no cross-linking between the polymer molecules, or materials in which there is some degree of cross-linking between the polymer molecules. Examples of non-cross-linked materials are polyethylene or PVC; examples of cross-linked materials are cross-linked polyethylene also known as "PEX", cross-linked PVC, etc.

In the following, the invention will at times be described with particular reference to a pipe produced by means of extrusion, it being understood that the invention applies, mutatis mutandis, also to pipes produced by other methods.

In prior art liners there are usually internal stresses which remain in the plastic material after it has been reformed and fixed. These stresses which are formed within the plastic material during the insertion of a prior art liner into the duct to be lined, cannot be completely released during the reforming step because of frictional forces between the liner and the duct wall. These problems are overcome to some extent by a liner in accordance with the invention, where during the release of the alternate left-right twist, stresses in the liner which may otherwise remain in the liner, are released. This characteristic is of particular importance when the liner is reformed to its memory shape in sections of the duct having bends (in which the liner follows a torturous path). Since the reforming process of the liner of the invention involves untwisting of alternate left and right twists, there is a local relative movement which reduces stresses within the reformed liner.

The following are some examples of combinations of deformations which may be included in the liner of the invention.

(i) twist deformation and size reduction deformation;

(ii) twist deformation and shape deformation;

(iii) twist deformation, shape deformation and size reduction deformation.

The invention also provides a method for lining of ducts making use of the liner of the invention. This method comprises the following steps:

(a) inserting a length of a plastic liner into a duct to be lined, the plastic liner having a second, deformed shape, and having a first undeformed memory shape, the deformation comprising one or more deformations, at least one of which being a twist deformation consisting of alternate left-right twists along the liner; and (b) heating said liner to a temperature in which, owing to the liner's memory properties it reforms to assume said memory shape; and (c) cooling the liner to fix its shape.

In accordance with the invention, a hollow deformed plastic liner having external dimensions at the deformed state, which are smaller than the internal dimensions of the duct to be lined, is inserted into the duct. The deformation in the liner may comprise only a twist deformation, but preferably, as pointed out above, the liner comprises a combined deformation, such as those specified. In order to reform the liner to assume its memory shape, a heated pressurized fluid is injected into the liner which heats it to a temperature at or above the activation temperature. In accordance with an embodiment of the invention, the temperature may then be further elevated to a second temperature which is typically above the melting temperature. Such a second heating may, for example, be in the case of a semi-crystalline cross-linked plastic material having two different deformations with two different associated activation temperatures. However, it should be noted that in accordance with another embodiment rather than a two-step process, it is possible also to heat the liner immediately to the higher activation temperature. Heating in such a one-stage process can, for example, be achieved by the use of a super heated steam or any other suitable heating fluid.

The pressure of the heating fluid may optionally then be increased to fix the liner so that it will become firmly attached to the duct's walls. Finally a cooling fluid may then be injected to fix the liner at its final shape.

The firm attachment of the liner to the walls of the duct may also be achieved by a pressurized cooling fluid which then has dual role of both ensuring such firm attachment and fixing the liner in its final shape.

The invention will now be described with reference to some non-limiting specific embodiments with reference to the annexed drawings and in the subsequent examples.

BRIEF DESCRIPTION OF THE DRAWINGS

FIG. 1A is an undeformed pipe as extruded.

FIG. 1B shows a liner after introduction of alternate left-right twists in accordance with the invention.

FIG. 1C shows a liner with a left-right twist deformation followed by size reduction deformation.

FIG. 1D shows a liner with a U-shape deformation introduced into the pipe followed by alternate left-right twists, in accordance with the invention.

FIG. 1E shows a liner comprising left-right twists in accordance with the invention introduced prior to introduction of a U-type deformation.

FIG. 10 shows a system for manufacturing of a liner of the type shown in FIG. 1D. The steps which are illustrated are the introduction of the U-type deformation, decrease in overall dimension and then the introduction of left-right twists.

DETAILED DESCRIPTION OF THE INVENTION

In accordance with the invention, a pipe is produced from a plastic material, and during the process of its preparation, at least one deformation, consisting of left-right twists, is introduced in the pipe. A preferred embodiment of the invention is the use of a pipe as a liner for lining of existing ducts. For such use, there is typically introduced at least one other deformation to the pipe which can be a size reduction deformation, a shape deformation or a combination of the two. The other deformations may be introduced during the process of formation of the deformed pipe, either after the left-right twists deformation or prior to the latter deformation, as will be illustrated further below. The result will obviously differ in the two cases, as the sequence of release of the deformations depends on the sequence of their introduction during the preparation.

Figures 1A, 1B, 1C, 1D, 1E:
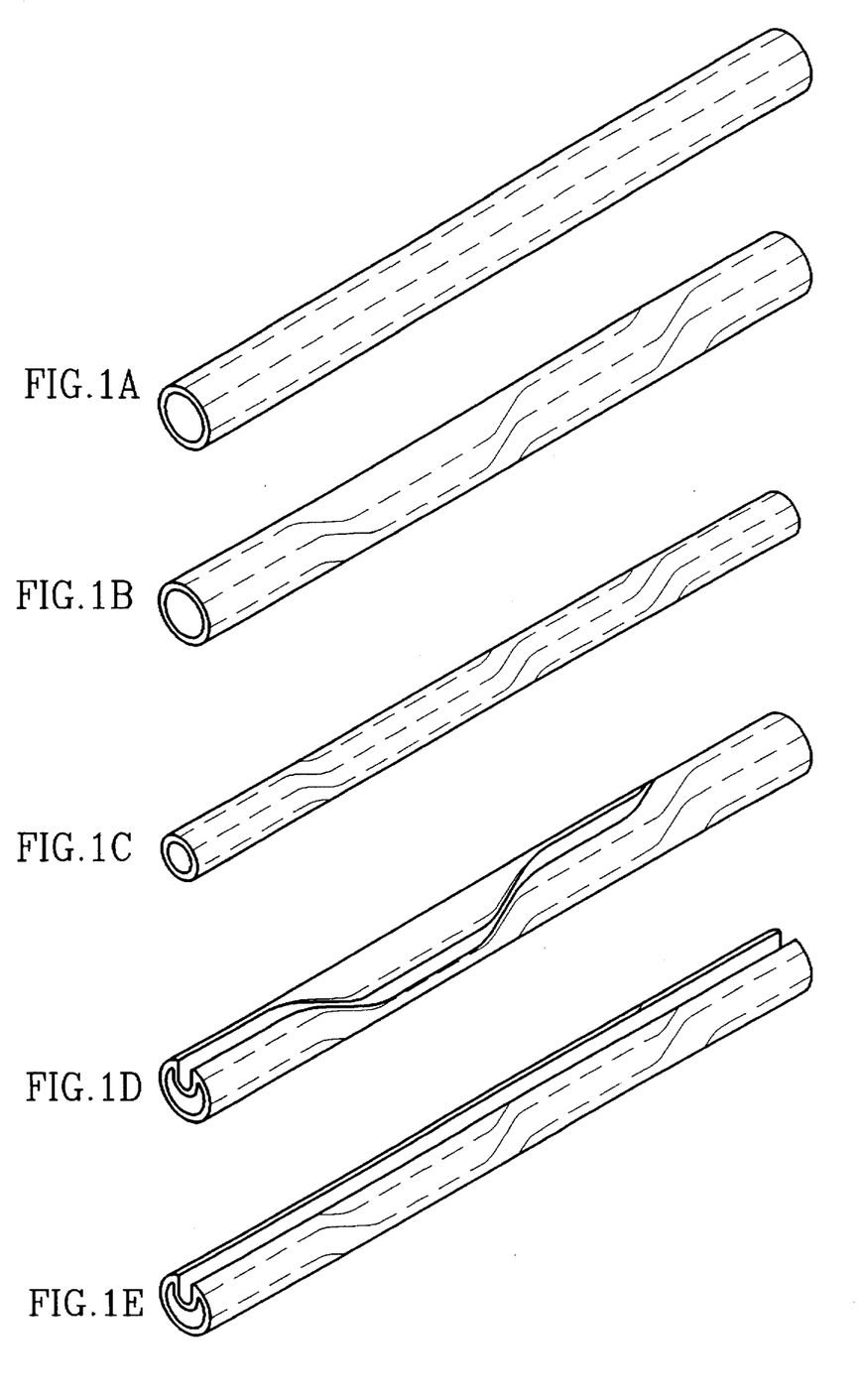
FIGS. 1A–1E show several embodiments of liners in accordance with the invention. The dashed lines in the liners shown in the figure were added only for purposes of illustration; it should be noted that such lines are not actually seen on such liners.

Reference is now being made to FIG. 1 showing several embodiments of a liner in accordance with the invention. FIG. 1A shows a section of a plastic pipe as originally extruded having a general cylindrical shape. FIG. 1B shows a section of a similar pipe after introduction of left-right twists in accordance with the invention. As already pointed out above, the dashed lines in the figures were added for illustrative purposes only so as to allow a clear demonstration of the twists. It should be appreciated that in reality there are no such lines and in fact twists introduced in the pipe are actually not externally visible. A liner having alternate left-right twists in accordance with the invention has essentially the same dimensions as the original pipe, without any change in either the cross-sectional shape and the cross-sectional size.

FIG. 1C shows a section of a liner in accordance with the invention with both left-right hand twist deformation and size reduction deformation. Such a liner may be produced by first introducing the left-hand twist and then the size reduction, but it is also possible to produce a pipe with the reversed sequence, i.e., size reduction followed by left-right twists.

FIGS. 1D and 1E show sections of liners with both left-right twist deformations and U-type deformation. In the case of the liner in FIG. 1D, the U-type deformation was introduced first and the liner was then deformed further with left-right twists. Consequently, as can be seen in FIG. 1D, the groove formed by the U-type deformation is twisted. Against this, in a liner of the kind shown in FIG. 1E, the U-type deformation was introduced following the introduction of the left-right twists and the groove is thus straight.

The liners of the kind shown in FIGS. 1C–1E have two different deformations. Depending on the type of material which is used, the two deformations can be introduced into the pipe in a manner so that they will be released both at the same activation temperature or alternatively, the two deformations can be introduced so that they will be released each at a different activation temperature. For example, in the case of a liner made from a semi-crystalline cross-linked material, such as cross-linked polyethylene (PEX), the U-type deformation may be introduced when the pipe is still hot following extrusion, then the twist deformation may be introduced after the pipe has somewhat cooled. This may yield a liner which will reform back to the original shape in two different reforming temperatures. In the case of a semi-crystalline cross-linked liner, it is obviously also possible to introduce the two deformations so that they will both be released, i.e. the reformation will occur, at the same temperature. In the case of a pipe made of a semi-crystalline thermoplastic material, such as polyethylene, or from an amorphous plastic material (thermoplastic or cross-linked) there will typically be a single activation temperature in which both deformations will be released.

Figure 2:
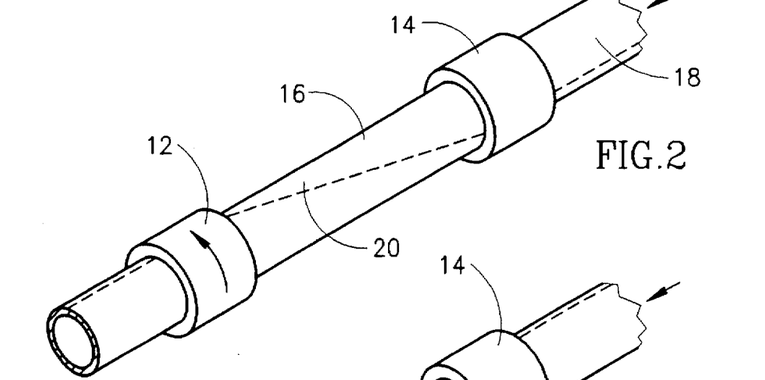
FIG. 2 shows a setup to obtain a left-right twist deformation.

Reference is now made to FIG. 2 showing, schematically, a setup for obtaining alternate left-right twists in accordance with the invention. The setup includes a rotational grip 12 which rotates in alternate clockwise and counter-clockwise rotations, and a stationery grip 14. The rotation of grip 12 causes a twist in the portion 16 of pipe 18 which lies between the two grips (the twists being represented schematically by dashed line 20; it is clear that such a contour is not seen in the actual liner).

Figures 3, 4:
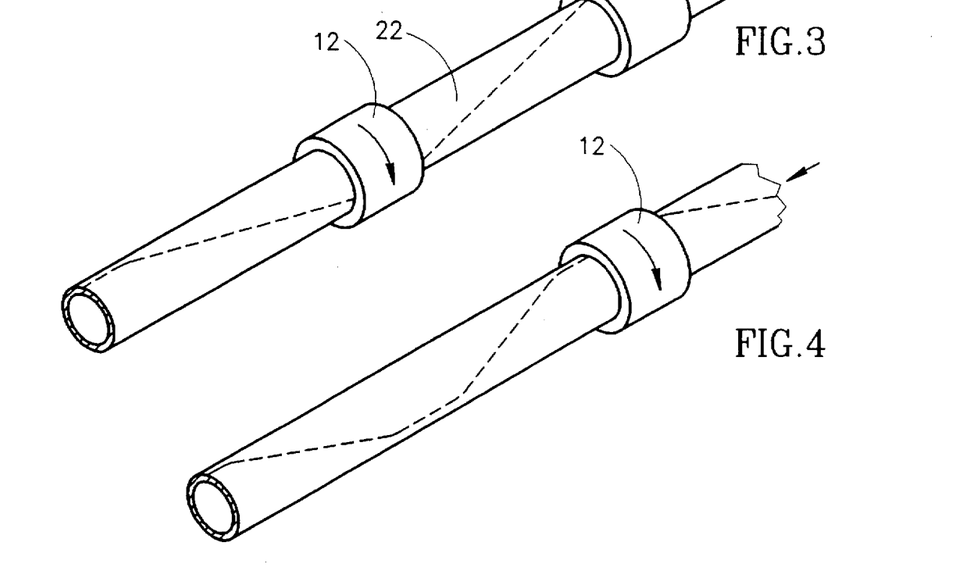
FIG. 3 shows schematically the process whereby the left-right twist deformation is introduced.
FIG. 4 presents a schematic view of a liner having a left-right twist deformation.

When the pipe moves to the position as shown in FIG. 3, a new portion 22 comes to lie between the two grips and then by counter-rotation of grip 12, a counter-directional twist can be introduced. After fixing of such twists by cooling of the liner, a liner with alternate left-right hand twists is obtained, as shown schematically in FIG. 4.

Figure 5:
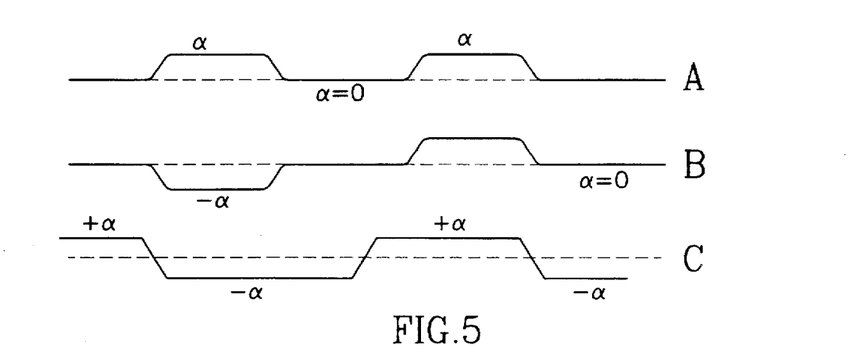
FIGS. 5A–5C show schematically several embodiments of twists which can be introduced in a liner.

FIG. 5 is a graphical representation of some of the types of twists which can be introduced in a pipe. In each case, dashed lines show a zero position, i.e., prior to introduction of a twist. In all the shown embodiments, portions of the pipe with introduced twists are separated from one another by straight, twist-free portions which means that after introduction of a twist, the rotation grip is maintained for some time in the fixed position and only then counter-rotated. In each of the embodiments, there is a twist in one direction and then a twist in another direction. The three different embodiments shown differ from one another in the manner of twisting of the pipe from the baseline position ($\alpha=0$). It should be understood that such twists may be made without separating the straight twist-free portion hence the rotation grip is constantly rotating clockwise and anti-clockwise respectively. It should be clear that although the twists demonstrated in FIG. 5 are symmetric, left-hand twists may differ from the right-hand twists in the angle of deviation from the base line, or may also be non-uniform along the liner.

In FIG. 5A, the liner has twists which consist of alternate twists, one at a certain degree $\alpha$ away from the 0 position and then the other, counter to it, back to the 0 position. In FIG. 5B, the twist consists of a first twist in one direction to a certain degree −α away from the baseline, then back to baseline and then another twist in the same direction to a degree +α and then a twist in a counter-direction back to baseline. In FIG. 5C, the twists consist of alternate twists in ±α rotations.

Figure 6:
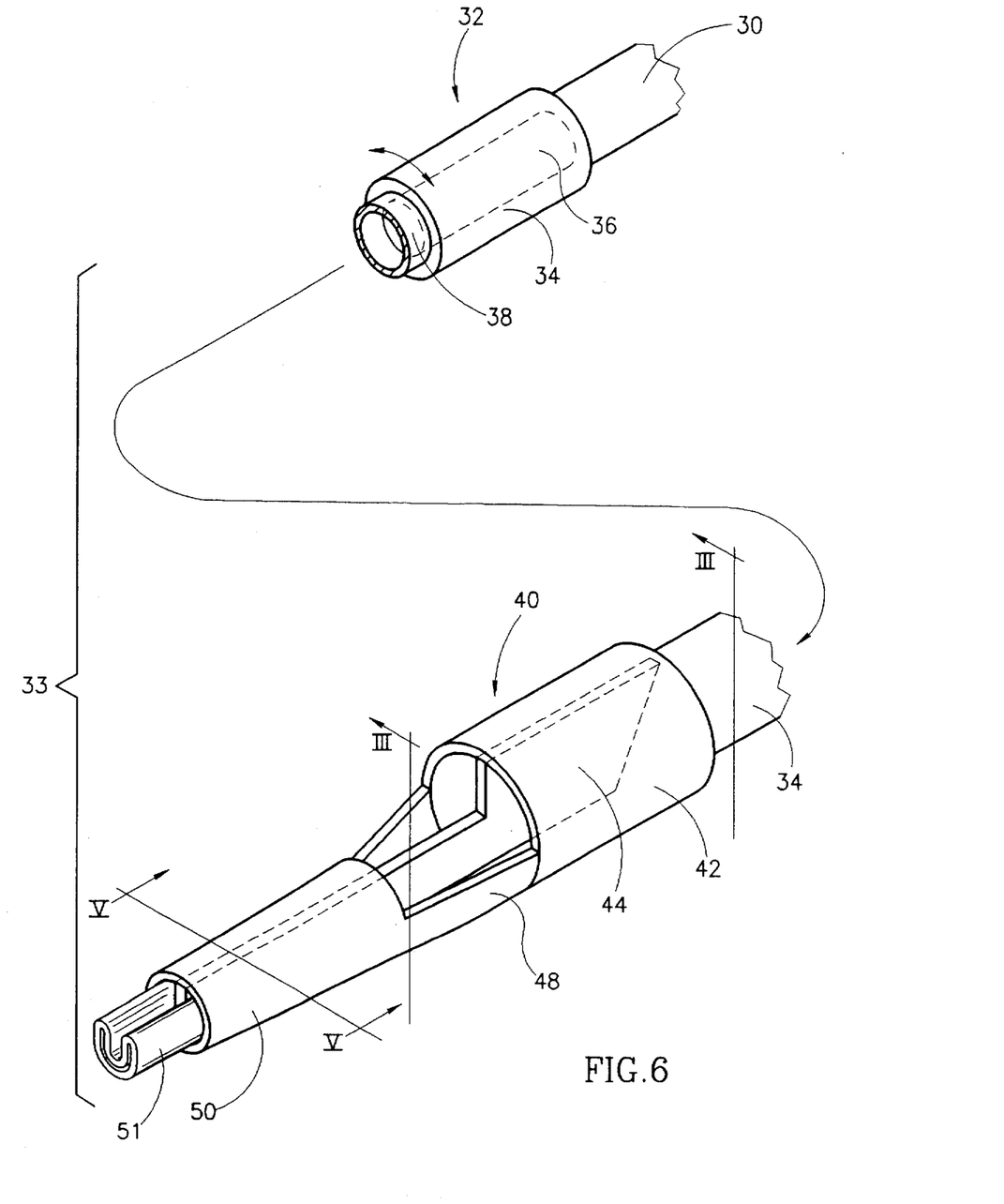
FIG. 6 shows schematically several steps in the process of manufacturing of a liner in accordance with the invention of the type shown in FIG. 1D. The steps illustrated are the introduction left-right twists, a U-type deformation and with an eventual decrease in overall dimensions.

Reference is now being made to FIG. 6, showing a pipe 30 after its extrusion (the extrusion step is not shown) which enters into a rotation grip 32 comprising an external member 34 and an internal mandrel 36. The annular space between members 34 and mandrel 36 is such that liner 30 fits snugly within. Member 34 rotates in alternate clockwise and counter-clockwise rotations. Consequently, the liner 38 egressing from device 32 has alternate left-right twists of the kind shown in FIG. 1B. Mandrel 36 serves in effect to support the liner from collapsing and seriously deforming during rotation. Such a mandrel is also preferably included within grip 12 of the system shown in FIG. 2. Thus, the liner 38 egressing from the rotation grip has essentially the same shape, diameter and wall thickness as the ingressing liner 30. The deformation induced in the device 32 is retained once the liner is subjected to an intermediate cooling stage.

Figure 7:
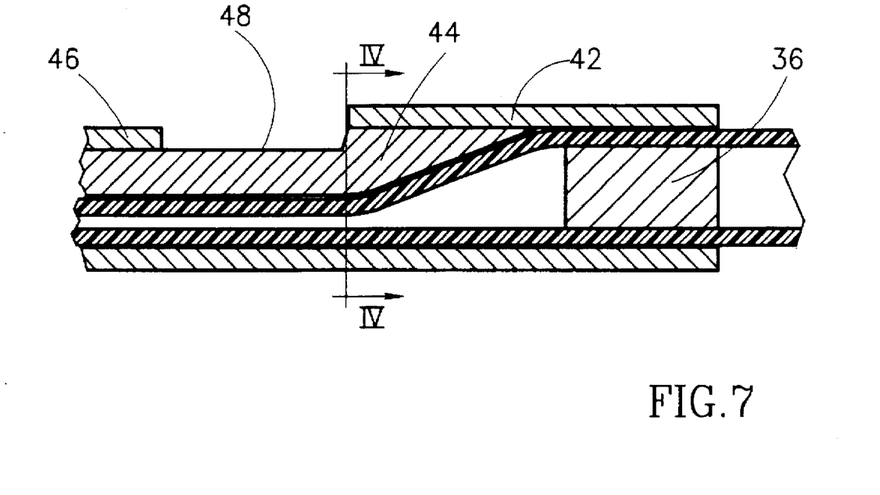
FIG. 7 is a longitudinal cross-section along lines III—III in FIG. 6.
Figure 8:
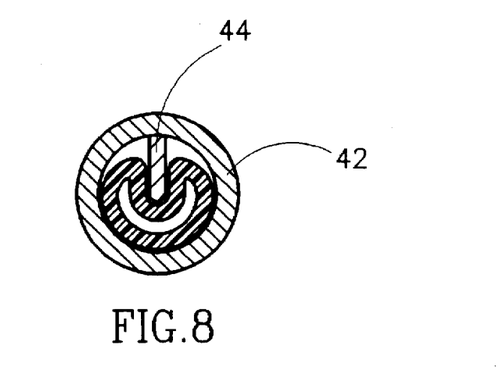
FIG. 8 shows a cross-section through lines IV—IV in FIG. 7.
Figure 9:
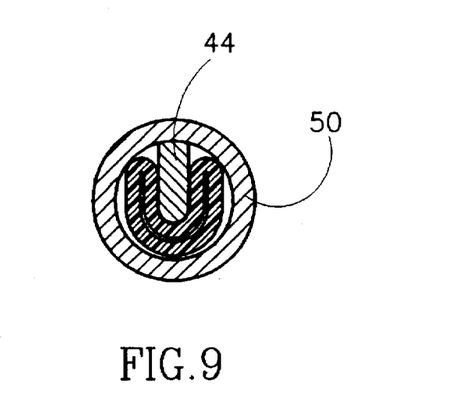
FIG. 9 shows a cross-section through lines V—V in FIG. 6.

From the device 32, liner 38 passes into a multi-stage mold 40. As can be seen in FIG. 7, rear cylindrical portion 42 of mold 40 has a downwardly protruding flange 44 which has a proximal oblique edge which causes the liner to assume a U-type shape, as can be seen in FIG. 8. Intermediate portion 48 of mold 40 changes its shape from general cylindrical to an excentric cone-like shape which causes a compression of the liner in the horizontal direction, thus reducing its width. In the final stage 50 of mold 40, where it assumes its final shape, the liner's temperature is further reduced and the liner 51 egressing from the mold has a compressed U-shape as can also be seen in FIG. 9. This liner is a liner of the kind shown in FIG. 1E.

Figure 10:
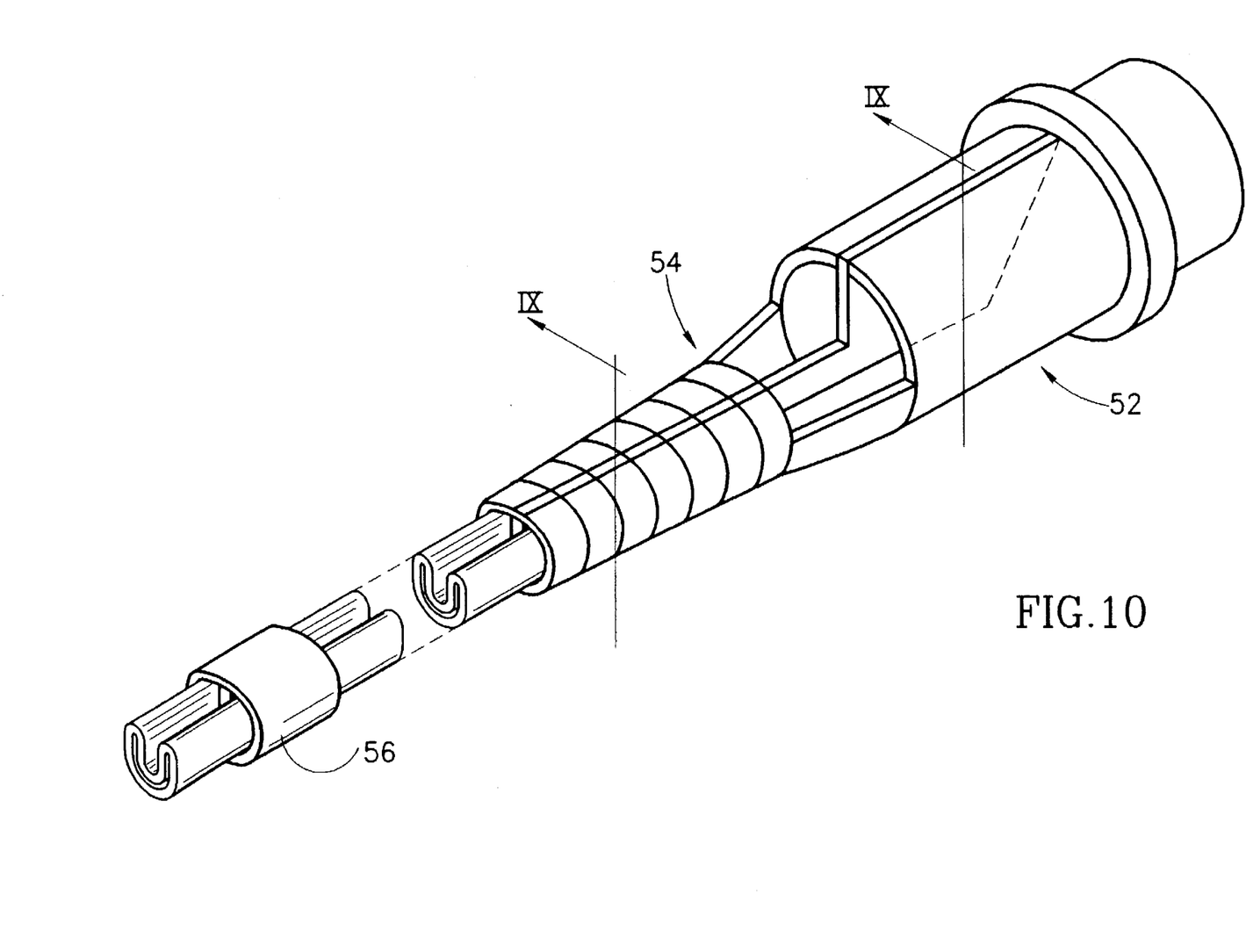
Figure 11:
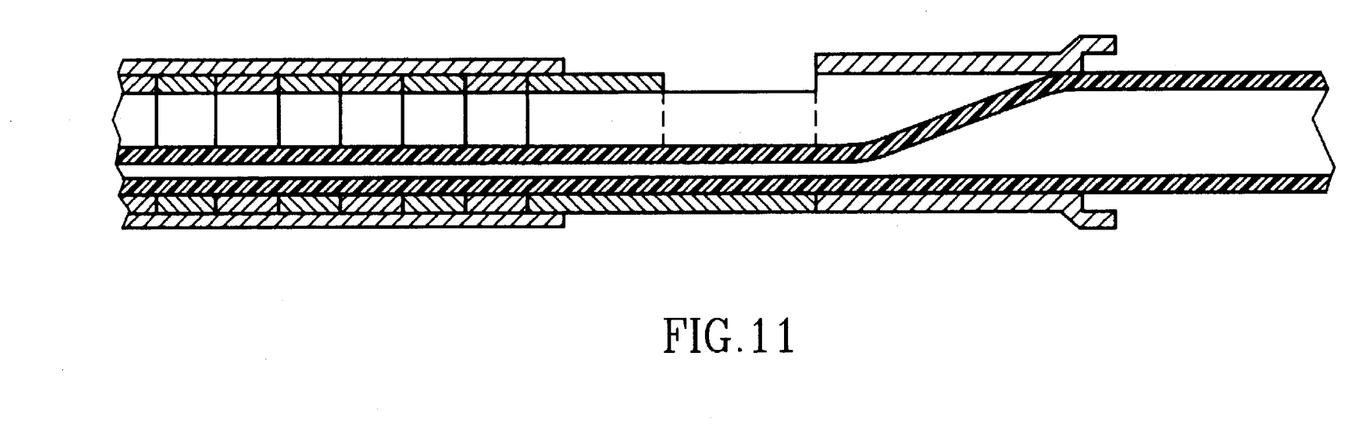
FIG. 11 shows a longitudinal cross-section through lines IX—IX in FIG. 10.

Reference is now being made to FIGS. 10–11 showing a setup for the preparation of a liner of the kind shown in FIG. 1D. The pipe first passes through a mold 52, which introduces a U-type deformation similarly as mold 40 in FIG. 6. After egressing from mold 52, the pipe enters into a cooling stage 54. From the cooling stage 54, the liner flows into a rotation grip 56 which rotates between different positions, and consequently, a liner of the kind shown in FIG. 1D is produced.

Figure 12:
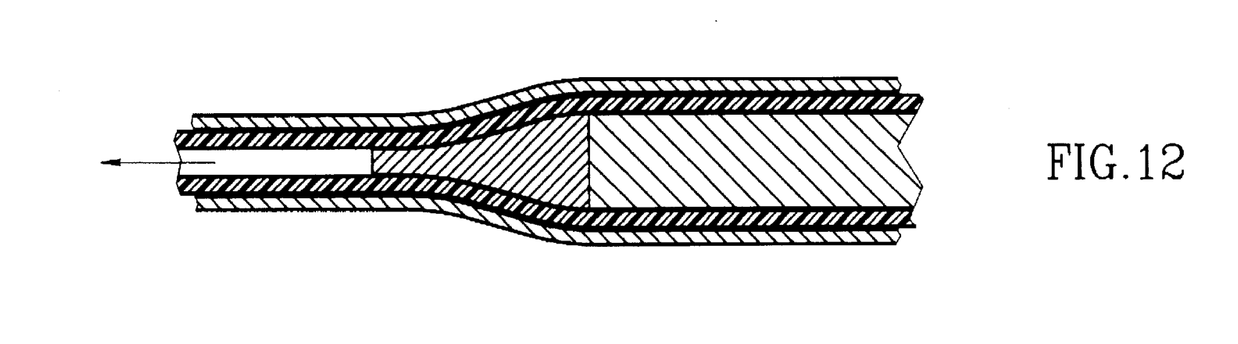
FIG. 12 is a schematic representation of the manner of introducing a size reduction deformation in the pipe.

In order to introduce combined left-right twists and size reduction deformation, following the introduction of left-right twists, in a device similar to device 32 shown in FIG. 6, the pipe is introduced into a mold of the kind shown in FIG. 12 where the cross-section of the liner gradually decreases.

EXAMPLE 1

Preparing a Cross-linked Deformed Liner Having Both Twist and "U" Type Deformations A cross-linked polyethylene liner was extruded with an original external diameter of 32 mm. The cross-linked polyethylene pipe has a temperature of about 210° C. upon leaving the extrusion dye. After leaving the extruder, the liner passed through a generally cylindrical mold with an integral downward internal projection extending diagonally from the proximal to the distal end, with a degree of inclination of about 20°. The liner was then passed through a cooling die 54 wherein its width was reduced to 25 mm. The alternate rotation of the rotational grip introduced the left-right twist in the liner, having the alternate rotations repeating themselves as shown schematically in FIG. 1D. The liner was then cooled down to ambient temperature.

EXAMPLE 2

Reforming a Deformed Cross-linked Liner

A liner manufactured in accordance with Example 1, was inserted into a duct to be lined. Once the leading edge of the deformed pipe reached the far end of the duct, the leading edge was sealed, and super-heated steam at a pressure of about 1.5 bar and at a temperature of 150° C. was introduced into the liner. This super-heated steam was pumped through the liner for about 100 mins.

After reformation of the liner to its original shape, a compressed air having a pressure of about 5 bar was introduced into the liner for about 100 mins. This pressurized air caused a further extension of the liner so as to ensure its firm attachment to the duct's walls and subsequently cooled the liner to ambient temperature.

We claim:

1. A plastic liner having a second, deformed shape, and having a memory of a first, undeformed memory shape, the deformation in the deformed shape comprising one or more deformations, at least one of which is a twist deformation consisting of alternate left-right twists along the liner.

2. A liner in accordance with claim 1, comprising at least two deformations, of which one is a said twist deformation and the other being at least one of a shape deformation and a size reduction deformation.

3. A liner according to claim 1, wherein the deformations are released at a single activation temperature.

4. A liner according to claim 1, comprising at least two deformations, and having two activation temperatures, a first activation temperature in which at least one of the deformations is released and a second activation temperature in which at least another of the deformations is released.

5. A method for lining of ducts comprising the steps of:
 (a) inserting a length of a plastic liner into a duct to be lined, the plastic liner having a second, deformed shape, and having a first undeformed memory shape, the deformation comprising one or more deformations, at least one of which is a twist deformation consisting of alternate left-fight twists along the liner; and
 (b) heating said liner to a temperature in which, owing to the liner's memory properties it reforms to assume said memory shape; and
 (c) cooling the liner to fix its shape.

6. A process according to claim 5, comprising a final step of introducing a high pressure fluid into the liner to bring to tight attachment of the formed liner to the walls of the duct.

* * * * *